United States Patent
Emde et al.

(10) Patent No.: US 10,988,128 B2
(45) Date of Patent: Apr. 27, 2021

(54) METHOD AND DEVICE FOR CONTROLLING A HYDRAULIC BRAKE SYSTEM

(71) Applicant: Robert Bosch GmbH, Stuttgart (DE)

(72) Inventors: Christoph Emde, Leingarten (DE); Heiko Druckenmueller, Mundelsheim (DE); Holger Kurz, Stuttgart (DE); Patrick Schellnegger, Ludwigsburg (DE); Yakup Navruz, Heilbronn (DE); Andreas Schmidtlein, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/415,122

(22) Filed: May 17, 2019

(65) Prior Publication Data
US 2019/0366999 A1 Dec. 5, 2019

(30) Foreign Application Priority Data

May 30, 2018 (DE) ...................... 10 2018 208 590.0

(51) Int. Cl.
| | |
|---|---|
| *B60T 17/04* | (2006.01) |
| *B60T 13/68* | (2006.01) |
| *B60T 13/16* | (2006.01) |
| *F15B 21/00* | (2006.01) |
| *B60T 15/02* | (2006.01) |
| *B60T 8/17* | (2006.01) |
| *B60T 8/40* | (2006.01) |

(52) U.S. Cl.
CPC .............. *B60T 13/686* (2013.01); *B60T 8/17* (2013.01); *B60T 8/4068* (2013.01); *B60T 13/161* (2013.01); *B60T 15/028* (2013.01); *F15B 21/008* (2013.01)

(58) Field of Classification Search
CPC .................................................... B60T 8/4068
See application file for complete search history.

(56) References Cited

U.S. PATENT DOCUMENTS

| | | | | |
|---|---|---|---|---|
| 2013/0026818 | A1* | 1/2013 | Schmidt | ................ B60T 8/4059 303/139 |
| 2019/0366996 | A1* | 12/2019 | Emde | .................... B60T 8/4054 |
| 2019/0367001 | A1* | 12/2019 | Emde | .................... B60T 13/686 |

FOREIGN PATENT DOCUMENTS

GB        2486062 A  *  6/2012   ............ B60T 8/4068

* cited by examiner

*Primary Examiner* — Nicholas J Lane
(74) *Attorney, Agent, or Firm* — Maginot, Moore & Beck LLP

(57) ABSTRACT

In a hydraulic brake system, which includes: a hydraulic pump which is driven by an electric motor and has the purpose of generating a fluid volume flow for the hydraulic brake system; and a solenoid valve for controlling the fluid volume flow from the hydraulic pump to a wheel brake, a method includes actuating the solenoid valve in such a way that by this means a fluid pulsation at the wheel brake is counteracted. Furthermore, the method may be implemented in a corresponding device.

7 Claims, 3 Drawing Sheets

METHOD AND DEVICE FOR
CONTROLLING A HYDRAULIC BRAKE
SYSTEM

This application claims priority under 35 U.S.C. § 119 to application no. DE 10 2018 208 590.0, filed on May 30, 2018 in Germany, the disclosure of which is incorporated herein by reference in its entirety.

The present disclosure relates to a method for controlling a hydraulic brake system, wherein the brake system comprises a hydraulic pump which is driven by an electric motor and has the purpose of generating a fluid volume flow for the hydraulic brake system, and the brake system comprises a solenoid valve for controlling the fluid volume flow from the hydraulic pump to a wheel brake, wherein the method is characterized in that the solenoid valve is actuated in such a way that by this means a fluid pulsation at the wheel brake is counteracted. Furthermore, the present disclosure relates to a corresponding device.

BACKGROUND

Driver assistance systems such as ESP require valves and a pressure supply unit in order to actively engage in the pressure modulation of the wheel brake calipers. These valves are usually embodied as solenoid valves which are firstly configured to regulate a predefined differential pressure and therefore have a very low hydraulic resistance. The design of a pressure supply unit which is used most frequently is the radial piston pump in combination with an eccentric which is driven by an electric motor. When operation at a constant rotational speed occurs, intake phases and delivery phases of the pump alternate periodically, wherein in an ideal case the volume flow respectively has a half-sine profile. In real operation, these profiles are however, also influenced by the behaviour of the inlet and outlet values. The delivered volume flow is, owing to the design, not constant over time but rather in an ideal case has a half-sine profile. These fluctuations give rise to audible pressure pulsations and, depending on the vehicle, can also give rise to perceptible vibrations at the steering wheel ("juddering").

In addition to the pulsations as a result of the half-sine profile, pressure peaks occur on the suction side as a result of air outgassing effects, while on the pressure side high-frequency pulsations are caused by the pump outlet valve (pump rattling). The pulsations are transmitted into the vehicle passenger compartment via structural vibrations of the hydraulic lines and are perceived as disturbing noises by the driver. This correspondingly has an NVH (noise-vibration-harshness) problem. In order to reduce the high-frequency pulsations which cause this, low-pass filter components (series connection of a capacitance and a throttle) can be installed. Disadvantages here are the costs of the damping measure, and also the throttle results in an additional load for the pump and motor.

SUMMARY

In contrast, the disclosed method and device advantageously permit the NVH behavior to be improved with reduced costs.

This is made possible according to the disclosure by means of the features specified herein.

The method according to the disclosure for controlling a hydraulic brake system, wherein the brake system comprises a hydraulic pump which is driven by an electric motor and has the purpose of generating a fluid volume flow for the hydraulic brake system, and the brake system comprises a solenoid valve for controlling the fluid volume flow from the hydraulic pump to a wheel brake, is characterized in that the solenoid valve is actuated in such a way that by this means a fluid pulsation at the wheel brake is counteracted.

For example, the control of a hydraulic brake system can be understood to be the control of an ESP system or of some other driver assistance system. Such a system generally has at least one solenoid valve for controlling a fluid volume flow from the hydraulic pump to a wheel brake. A solenoid valve is to be understood as being, for example, an inlet valve which is, for example, open in the currentless state and can be closed by electromagnetic activation. In this sense, actuation of the solenoid valve can be understood as meaning the adjustment of the valve setting. The adjustment of the fluid flow rate which can pass through the valve is also carried out in this way.

The counteraction of the fluid pulsation is achieved by virtue of the fact that the pressure fluctuations and/or the volume fluctuations in the brake system are reduced. The fluid pulsations in the line system are smoothed. Likewise, smoothing of a fluid pulsation at the wheel brake is brought about. For example, the optimization is carried out by avoiding or reducing the pulsations which occur as a result of the half-sine-shaped volume flow profile in the case of a radial piston pump with an eccentric. Alternatively or additionally, the optimization takes the form of reducing the pressure peaks which occur owing to air outgassing effects on the suction side. Alternatively or additionally, the optimization is carried out by reducing high-frequency pulsations which are generated by a pump outlet valve on the pressure side, that is to say takes the form of reducing the pressure oscillation amplitude. In particular, optimized actuation of a brushless direct current motor (BLDC, brushless DC motor) is provided. In particular, periodic actuation of the solenoid valve can advantageously take place—synchronized with the rotor position of the pump motor.

An increase in the hydraulic resistance of a solenoid valve is advantageously brought about at least temporarily by the disclosed method in order to be able to use it as a throttle for a low-pass filter. The optimized actuation permits a chronologically virtually constant volume flow to be set independently of the pressure difference, which corresponds to a very high hydraulic resistance. The volume flow can therefore be smoothed to a greater extent in the effective range of the low-pass filter than with a static throttle. Furthermore, costs for a static throttle can be saved and the motor load (pump load) in the case of highly dynamic maneuvers can be reduced. Therefore, such actuation advantageously avoids pressure pulsations, or at least reduces them. As a result, disruptive noises are avoided or at least reduced. In general, this leads to an improvement of the NVH (noise-vibration-harshness) behavior. The optimized actuation also advantageously makes a constant delivered fluid volume flow possible. Furthermore, the novel actuation results in a cost reduction, since it is possible to dispense with further physical damping measures in the hydraulic brake system, for example with the hydraulic capacitance and the throttle.

In one advantageous embodiment, the method is characterized in that the solenoid valve is actuated in such a way that by this means a defined throttle effect in the fluid volume flow from the hydraulic pump to the wheel brake is brought about.

This is to be understood as meaning that a defined throttle effect in the fluid volume flow is set by means of the actuation of the solenoid valve. This throttle effect which is achieved is generated in such a way that it counteracts the fluid pulsations. This makes it possible for fewer fluid pulsations to be present or to occur at the wheel brake.

In one possible refinement, the method is characterized in that the solenoid valve is actuated in such a way that by this means a chronologically varying hydraulic resistance in the fluid volume flow from the hydraulic pump to the wheel brake is adjusted.

This is to be understood as meaning that a defined hydraulic resistance is generated by means of the actuation of the solenoid valve. The solenoid valve as a result makes a function such as a throttle possible. However, this throttle effect is advantageously adjustable in terms of its intensity and time profile by the actuation (of the valve). The actuation occurs according to demand, in order to reduce fluid pulsations or attenuate their propagation.

In one preferred embodiment, the method is characterized in that a degree of opening of the solenoid valve is varied periodically.

This is understood as meaning that the stroke height is varied at a regular distance with, for example, a recurring pattern. The stroke height (or degree of opening) of the valve defines here the through-flow quantity. In this way, the through-flow quantity of the fluid which is desired at the respective time is therefore adjusted by means of the actuation of the solenoid valve. This variation (modulation) correspondingly takes place in order to reduce or avoid the fluid pulsations. For example, for this purpose the rotational speed can be changed in a half sine shape in the case of a radial piston pump with 2 pistons. That is to say the opening profile of the valve is ideally matched to the existing pump structure. Owing to the pump structure with two identical pistons, the stroke profile is identical along the intake phase and delivery phase for both pumps and can therefore be set uniformly for both pistons. In the case of a pump structure with two pistons which are opposite one another, the respective ideal degree of opening continues to repeat every 180° rotational angle of the electric motor rotor.

In one alternative development, the method is characterized in that a degree of opening of the solenoid valve is varied during one revolution of the electric motor.

This is understood as meaning that the degree of opening of the solenoid valve is modulated during one revolution of the rotor of the electric motor in such a way that a fluid pulsation is counteracted. That is to say the stroke height of the valve is varied during one revolution of the electric motor of the pump, in order to reduce fluid pulsations and to reduce their propagation and therefore bring about a reduction in the fluid pulsations at the wheel brake. Of course, it is also possible to provide for the stroke profile to be varied during a plurality of revolutions or during one part of a revolution. For example, the stroke profile is defined for a half revolution (half sine shape). The stroke height of the valve is varied here or defined specifically in the course of this half revolution of the rotor of the pump motor.

In one advantageous refinement, the method is characterized in that the solenoid valve is actuated taking into account the pump setting.

This is understood as meaning that the optimized actuation is carried out on the basis of or as a function of the position of the hydraulic pump. The degree of opening of the valve can be determined here, for example, as a function of the pump setting. Pump setting is understood to be the state or a position of the pump. The pump setting can be defined by means of the state of a pump component, for example from the rotational angle of the pump or the rotor position of the electric motor which drives the pump. The optimized actuation of the solenoid valve is as a result configured as a rotational-angle-dependent actuation. In this context, the current pump setting can advantageously be taken into account or else a pump setting which is to be expected at a defined point in time—in particular in a close interval.

In one possible embodiment, the method is characterized in that a degree of opening of the solenoid valve is adjusted as a function of a rotor position of the electric motor.

This is understood as meaning that the stroke height of the solenoid valve is modulated as a function of a rotor position of the electric motor in such a way that the fluid pulsation in the hydraulic brake system is counteracted. For example, in a first rotor position a first stroke height is set and in a second rotor position a second stroke height is set which is different from the first stroke height. In principle, the suitable stroke height can be set at every rotor position. Such an implementation corresponds to the definition of an armature stroke profile over the angular setting of the rotor or of a hydraulic resistance profile over the time of one revolution. For this, a rotor position sensor is advantageously used and evaluated. On the basis of the rotor position which is determined in this way it is possible to define and apply a suitable actuation current strength for the coil of the solenoid valve.

In one preferred refinement, the method is characterized in that the method comprises at least one of the following steps:
  defining the volume flow of the pump,
  determining the necessary pressure difference between pump and wheel brake in order to smooth the fluid pulsation,
  determining the required control flow in order to set a valve setting by means of which the required pressure difference is brought about on the basis of the throttle effect which is formed thereby,
  actuating the solenoid valve with the determined control flow in order to set the corresponding valve setting.

Each step is advantageously configured as a function of the pump setting or the rotor position of the electric motor of the pump. Furthermore, the method advantageously comprises all the steps.

If the hydraulic and electronic properties of the valves are known, it is possible to calculate, on the basis of a volume flow balance, a control flow which keeps the volume flows via the valves as constant as possible. For the desired pressure difference at an inlet valve $\Delta p_{EV}$, initially the following is obtained (for the front axle (VA) here):

$$\Delta p_{EVVA} = p_{damper} - p_{VA} = f_{damper}\left(\int_0^t (Q_{PE} - Q_{VA} - Q_{HA}) d\tilde{t}\right) - f_{VA}\left(\int_o^t Q_{VA} d\tilde{t}\right)$$

Here, $Q_{PE}$ denotes the volume flow from the pump as a function of the rotational angle which can be assumed in a good approximation to be a half-sine profile. $Q_{VA}$ and $Q_{HA}$ denote the (initially unknown) volume flows via the inlet valves for the front axle and rear axle. The functions $f_{damper}$ and $f_{vA}$ stand for the pV curves of the damper capacity and of the wheel elasticity. If the volume flows $Q_{VA}$ and $Q_{HA}$ are each predefined as being chronologically constant, the desired pressure difference is obtained as a function of the rotational angle. If the valve properties are known, a chronologically variable control flow can be determined on the basis of the predetermined volume flow and the calculated pressure difference, which control flow actually sets this volume flow at the valve.

This method can be implemented, for example, using software or hardware or using a mixed form of software and hardware, for example in a control unit. It is therefore possible to provide a control unit for controlling a solenoid valve which is configured to carry out the described method.

The approach which is presented here additionally provides a device which is designed to carry out, actuate or implement the steps of a variant of a method presented here, in corresponding devices. This embodiment variant of the method, in the form of a device, can also quickly and efficiently solve the problem on which the disclosure is based. A device can be understood here to be an electrical device which processes sensor signals and outputs control signals and/or data signals as a function thereof. The device can have an interface which can be embodied by means of hardware and/or software. In the case of a hardware embodiment, the interfaces may be, for example, part of what is referred to as a system ASIC, which includes a wide variety of functions of the device. However, it is also possible for the interfaces to be separate integrated circuits or to be composed at least partially of discrete components. In the case of a software embodiment, the interfaces can be software modules which are present, for example on a microcontroller in addition to other software modules.

A computer program product or computer program with program code which can be stored on a machine-readable carrier or storage medium such as a semiconductor memory, a hard disk memory or an optical memory and is used to carry out, implement and/or actuate the steps of the method according to one of the embodiments described above, in particular when the program product or program is executed on a computer or a device, is also advantageous.

A device can furthermore also be understood here to be a brushless direct current motor for driving a pump of a hydraulic brake system, wherein the direct current motor comprises a rotor position sensor.

A device is furthermore to be understood to be a hydraulic brake system which is configured to carry out the method described, wherein the brake system is free of a static throttle in order to smooth a fluid pulsation at the wheel brake. In contrast, there is advantageously provision that the function of the throttle is fulfilled by means of the solenoid valve. In particular, the inlet valve is advantageously used for this purpose, which as a result additionally performs the function of setting a hydraulic resistance according to demand. There is advantageously provision that a hydraulic low-pass filter is formed from a series circuit of a hydraulic capacitance and a solenoid valve, which can be actuated as a throttle.

BRIEF DESCRIPTION OF THE DRAWINGS

It is to be noted that the features which are specified individually in the description can be combined with one another in any desired technically appropriate way and indicate further refinements of the disclosure. Further features and the expediency of the disclosure emerge from the description of exemplary embodiments on the basis of the appended figures, of which.

DETAILED DESCRIPTION

Figure 1:
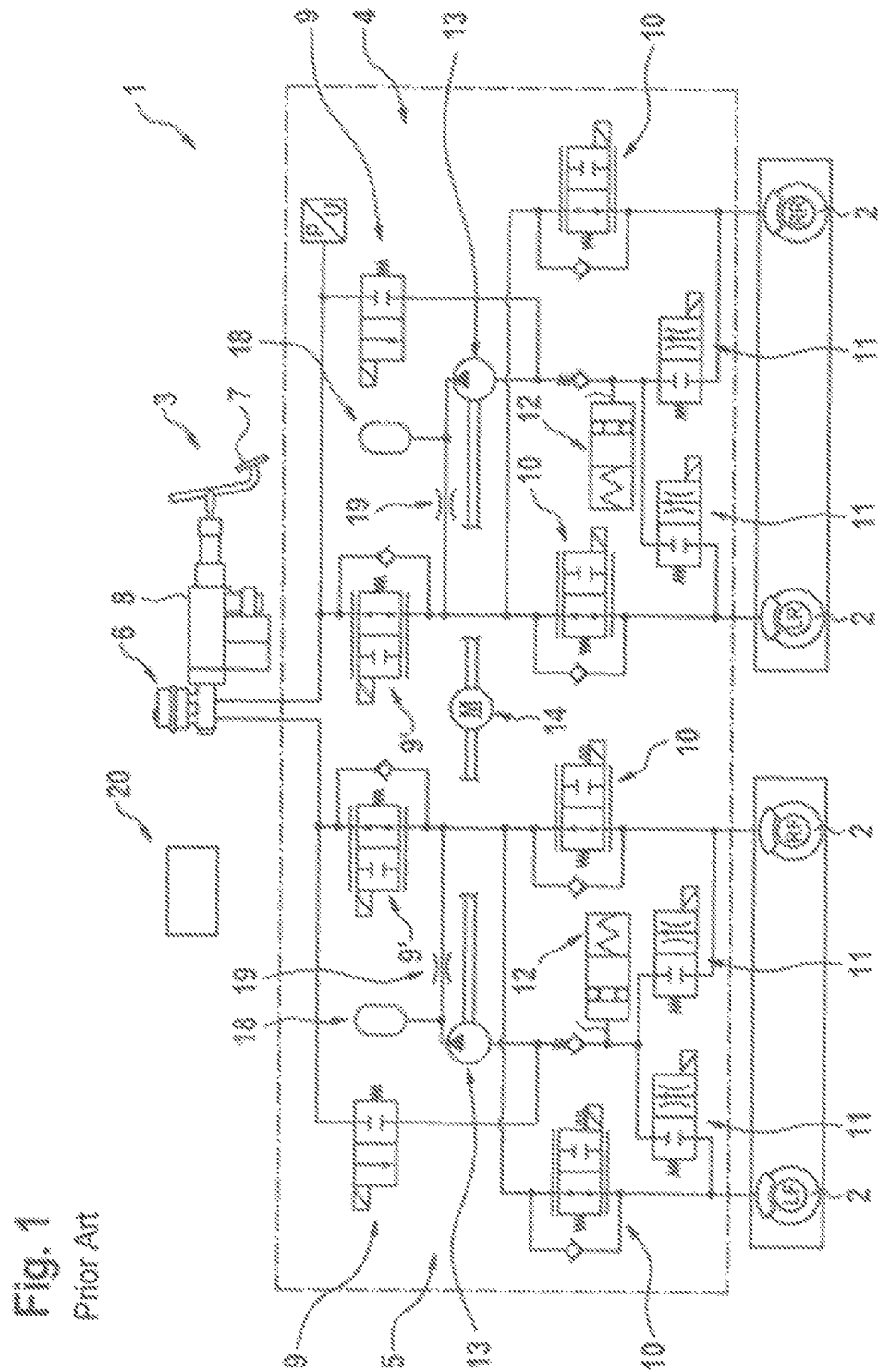
FIG. 1 shows a brake system of a motor vehicle in a simplified illustration.

FIG. 1 shows a simplified illustration of a brake system 1 for a motor vehicle (not illustrated in more detail here). The brake system 1 has a plurality of wheel brakes 2 which can be activated by a driver of the motor vehicle by a brake pedal device 3 as service brakes. The wheel brakes 2 are denoted here by LR, RF, LF and RR, which clarifies their position or assignment on the motor vehicle, where LR stands for left rear, RF stands for right front, LF stands for left front and RR stands for right rear. Two brake circuits 4 and 5 are formed between the brake pedal device 3 and the wheel brakes 2, wherein the brake circuit 4 is assigned to the wheel brakes LF and RR, and the brake circuit 5 is assigned to the wheel brakes LR and RF. The two brake circuits 4 and 5 are of identical design, and the design of the two brake circuits 4, 5 will therefore be explained in more detail below with reference to the brake circuit 4.

The brake circuit 4 is firstly connected to a master brake cylinder 6 of the brake pedal device 3, wherein the brake pedal device 3 also has a brake pedal 7 which can be activated by the driver and a brake booster 8. The brake booster 8 can be actuated, for example, pneumatically or electromechanically. The brake circuit 4 has a switch-over valve 9' and a high-pressure switching valve 9, which are connected in parallel with one another and follow the master brake cylinder 6. The switch-over valve 9' is designed so as to be open in the currentless state and permits a flow of the hydraulic medium of the brake circuit, that is to say the brake fluid, in both directions. The high-pressure switching valve 9 is designed so as to be closed in the currentless state, and in the energized state it permits a through flow of brake fluid only in the direction of the wheel brakes 2. The switch-over valve 9' is also connected to the two wheel brakes 2 with intermediate connection of in each case an inlet valve 10 which is designed to be opened in both directions in the currentless state. If the two switch-over valves 9' of the brake circuits 4, 5 are closed, the hydraulic pressure remains shut in or maintained in the section of the brake circuits 4, 5 which lies behind, that is to say between, the switch-over valves and the wheel brakes 2, even if the brake pedal 7 is relieved of loading by the driver.

The wheel brakes 2 of the brake circuit 4 are also each assigned an outlet valve 11 which is designed so as to be closed in the currentless state. The outlet valves 11 have a hydraulic pressure accumulator 12 connected downstream of them. The outlet valves 11 are also connected on the outlet sides to a suction side of a pump 13 which is connected to the brake circuit 4 on the pressure side between the switch-over valve 9' and the inlet valves 10. The pump 13 is mechanically coupled to an electric motor 14. There is provision that the electric motor 14 is assigned to the pumps 13 of both brake circuits 4 and 5. Alternatively there can also be provision that each brake circuit 4, 5 has a separate electric motor 14. A control unit 20 controls both the electric motor 14 and the valves 9, 9', 10, 11.

In ESP systems from the prior art, pressure dampers are used which are composed of a capacitive component and a throttle. For example, such a pressure damper is positioned between the pump 13 and the inlet valve 10 of each brake circuit 4, 5. The pressure dampers are formed from a hydraulic capacitance 18 and a hydraulic resistor (throttle) 19. The fluctuations in pressure and volume of the fluid volume flow which are generated by the pump 13 are reduced by this pressure damper. When there is an active build-up of pressure in the wheel brakes 2, the inlet valves 10 are fully opened in order to generate as little resistance as possible. In one refinement of the disclosure there is, in contrast, provision to significantly increase the hydraulic resistance of the inlet valves 10, and therefore to be able to achieve the required throttle effect. A separate throttle 19 is no longer required.

Figure 2:
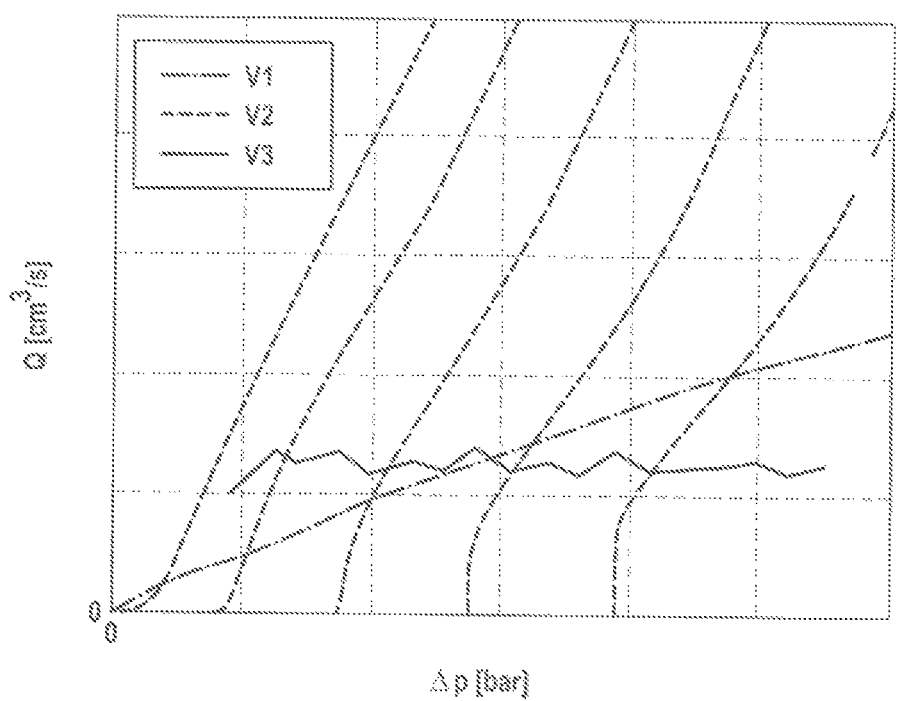
FIG. 2 shows through-flow characteristic curves.

FIG. 2 represents an illustration of different through-flow characteristic curves. The X axis shows here a pressure difference, and the Y axis shows a volume flow. FIG. 2 shows here three different systems in comparison. The dot-dashed line shows the through-flow characteristic curve V1 of a static throttle, the dashed line shows the through-flow characteristic curve V2 of a solenoid valve with constant energization (with the current strengths I from left to right [0.12; 0.14; 0.16; 0.18; 0.20] ampere), and the continuous line shows the through-flow characteristic curve V3 of a solenoid valve with an optimized rotational-angle-dependent energization, as proposed in the disclosure. In this embodiment, the volume flow remains virtually constant over a wide pressure range. The hydraulic resistance dp/dQ is therefore higher than for a static throttle, and very much higher than in the case of a typical solenoid valve with constant energization.

Figure 3:
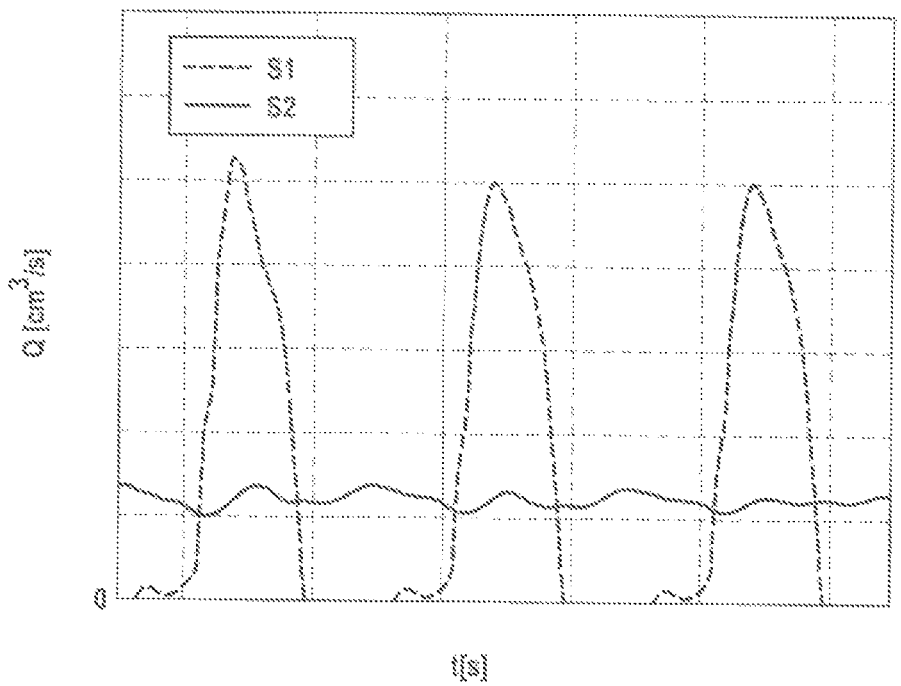
FIG. 3 shows volume flow profiles.

FIG. 3 represents an illustration of different through-flow characteristic curves. The X axis shows here a timeline, and the Y axis shows a volume flow. In this context, two different systems are shown in comparison. The dotted line shows here the volume flow profile S1 in the wheel line without a pressure damper. The continuous line shows the volume flow profile S2 in the case of a system with hydraulic capacitance in combination with a solenoid valve with optimized rotational-angle-dependent actuation. The optimized volume flow profile can be clearly seen. An essentially constant profile is present. The volume flow peaks are also clearly reduced.

It is to be noted that the scaling of the X axes and Y axes in the respective illustrations (a=prior art, b=embodiment of the disclosure) is the same. As a result, the differences can be easily determined.

The invention claimed is:

1. A method for controlling a hydraulic brake system, said hydraulic brake system including a hydraulic pump which is driven by an electric motor and generates a fluid volume flow for the hydraulic brake system, and a solenoid valve that controls the fluid volume flow from the hydraulic pump to a wheel brake, the method comprising:
    actuating the solenoid valve in such a way that a fluid pulsation at the wheel brake is counteracted by:
        defining, with a control unit of the hydraulic brake system, the fluid volume flow of the hydraulic pump as a function of a rotational angle of the hydraulic pump or a rotor position of the electric motor;
        determining, with the control unit, based on the defined fluid volume flow, a desired pressure difference between the hydraulic pump and the wheel brake that is necessary to smooth the fluid pulsation;
    determining, with the control unit, a required control flow through the solenoid valve to achieve the desired pressure difference based on a throttle effect which is caused by a degree of opening of the solenoid valve; and
    actuating, with the control unit, the solenoid valve with the degree of opening to achieve the determined required control flow.

2. The method according to claim 1, wherein the actuating of the solenoid valve includes actuating the solenoid valve so as to adjust a chronologically varying hydraulic resistance in the fluid volume flow from the hydraulic pump to the wheel brake.

3. The method according to claim 1, wherein the actuating of the solenoid valve includes periodically varying the degree of opening of the solenoid valve.

4. The method according to on claim 1, wherein the actuating of the solenoid valve includes varying the degree of opening of the solenoid valve during one revolution of the electric motor.

5. The method according to claim 1, wherein the actuating of the solenoid valve includes taking into account a pump setting.

6. A control unit of a hydraulic brake system that includes a hydraulic pump which is driven by an electric motor and generates a fluid volume flow for the hydraulic brake system, and a solenoid valve that controls the fluid volume flow from the hydraulic pump to a wheel brake, said control unit comprising a processor configured to execute program instructions stored in a memory to:
    actuate the solenoid valve in such a way that a fluid pulsation at the wheel brake is counteracted by:
        defining the fluid volume flow of the hydraulic pump as a function of a rotational angle of the hydraulic pump or a rotor position of the electric motor;
        determining, based on the defined fluid volume flow, a desired pressure difference between the hydraulic pump and the wheel brake that is necessary to smooth the fluid pulsation;
        determining a required control flow through the solenoid valve to achieve the desired pressure difference based on a throttle effect which is caused by a degree of opening of the solenoid valve; and
        actuating the solenoid valve with the degree of opening to achieve the determined required control flow.

7. A hydraulic brake system comprising:

an electric motor;

a hydraulic pump driven by the electric motor so as to generate a fluid volume flow for the hydraulic brake system, a wheel brake; and a solenoid valve that controls the fluid volume flow from the hydraulic pump to the wheel brake; and a control unit configured to actuate the solenoid valve in such a way that a fluid pulsation at the wheel brake is counteracted by:
    defining the fluid volume flow of the hydraulic pump as a function of a rotational angle of the hydraulic pump or a rotor position of the electric motor;
    determining, based on the defined fluid volume flow, a desired pressure difference between the hydraulic pump and the wheel brake that is necessary to smooth the fluid pulsation;
    determining a required control flow through the solenoid valve to achieve the desired pressure difference based on a throttle effect which is caused by a degree of opening of the solenoid valve; and
    actuating the solenoid valve with the degree of opening to achieve the determined required control flow, wherein the brake system does not include a static throttle in order to smooth a fluid pulsation at the wheel brake.

\* \* \* \* \*